W. J. FISHER.
AERONAUTICAL BALANCE INDICATOR.
APPLICATION FILED APR. 1, 1918.

1,411,883. Patented Apr. 4, 1922.

Inventor:
William J. Fisher
by Francis J. Dakin
his Attorney.

UNITED STATES PATENT OFFICE.

WILLIAM J. FISHER, OF WALTHAM, MASSACHUSETTS.

AERONAUTICAL BALANCE INDICATOR.

1,411,883.  Specification of Letters Patent.  Patented Apr. 4, 1922.

Application filed April 1, 1918. Serial No. 225,914.

*To all whom it may concern:*

Be it known that I, WILLIAM J. FISHER, a citizen of the United States, residing at Waltham, in the county of Middlesex and State of Massachusetts, have invented a new and useful Improvement in Aeronautical Balance Indicators, of which the following is a specification, reference being had therein to the accompanying drawings.

My invention relates to an aeronautical balance indicator for use on aeroplanes and other aerial vehicles.

The object of my invention is to provide a device for indicating when the aeroplane or other aerial vehicle is inclined or out of balance either laterally or longitudinally or both, and the amount of variation from a level position.

Another object of the invention is to secure a device which is at all times positive and accurate in its action and yet simple in construction and operation.

An additional object of the invention is to provide a device which is small and compact and which can be mounted in any convenient position without requiring an appreciable amount of space.

Other objects of the invention will be more specifically pointed out and described hereinafter.

Briefly, my invention contemplates means fixed on the aeroplane to indicate the plane of balance; that is, the plane in which the aeroplane is proceeding when on a level.

Cooperating with said fixed means, are means for showing the inclination of the aeroplane either longitudinally or laterally or both and the direction and amount of said inclination in each case.

Figure 1:
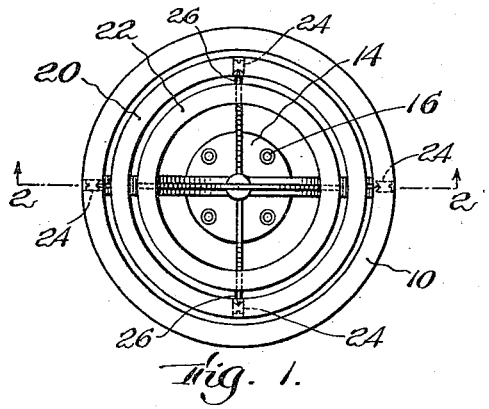
Figure 2:
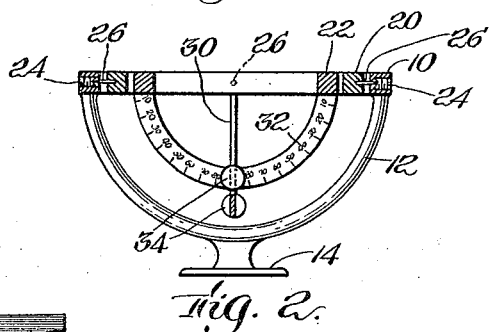
Figure 5:
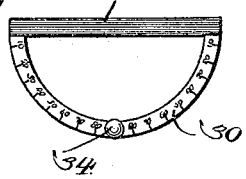
Figure 3:
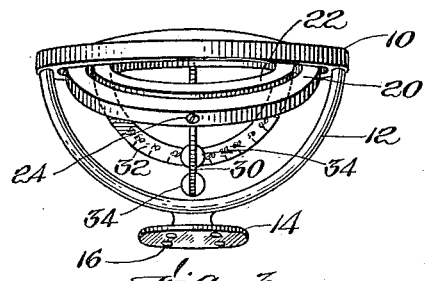
Figure 4:
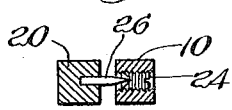

In the drawings illustrating one embodiment of my invention, Figure 1 is a plan view of a device constructed and operated in accordance with my invention; Fig. 2 is a central vertical sectional view of the same; Fig. 3 is a rear elevation in perspective of the device as viewed from the operator's seat, showing a forward dip of the aeroplane; Fig. 4 is a detail view of a bearing; and Fig. 5 is a detail view of one of the indicating rings.

Referring to the drawings, 10 designates a ring or plate carried by a bracket 12 having a base 14 provided with holes 16 to receive screws or nails whereby the bracket may be secured in fixed position on the aeroplane where it can at all times be seen by the pilot. The ring 10 denotes the plane in which the aeroplane travels and this fact, of course, must be borne in mind when the device is mounted in place for the ring constitutes the fixed means for denoting the plane of the aeroplane when in flight.

For the purpose of showing the inclination of the aeroplane when in flight both longitudinally and laterally, various means may be provided for cooperating with said fixed means and one form is shown in the drawing comprising two rings 20 and 22. The former ring 20 is mounted at two opposite points on the fixed ring 10 and the latter ring 22 is mounted in the ring 20 at two opposite points, which lie in a line perpendicular to a line in which are the two pivot points of the ring 20. In order that the two rings 20 and 22 may rotate freely on their respective pivot points, any suitable anti-friction bearings may be provided. As shown in Figs. 2 and 4, the fixed ring 10 is bored and threaded to receive a screw 24 having its inner end provided with a cone-shaped recess to receive the sharp end of a pin 26 set in the side of the ring 20. By turning the screw 24 the bearing may be adjusted to prevent any lateral motion of the pin. All of the bearings are preferably of this same construction.

In order to balance the rings 20 and 22, they are provided with depending semi-circular meridian bands 30 and 32 respectively, each band having a weight 34 formed on its lower portion. Each of the bands 30 and 32 lies in a plane perpendicular to the plane of travel of its respective ring.

If desired the meridian band on each of the rings 20 and 22 may be provided with graduations in degrees for indicating the angle of the dip; the pilot merely noting the number of degrees which the ring 10 is elevated or depressed below the rings 20 and 22. In order to further distinguish the rings, they may be colored in different tints so that one color will represent a lateral dip and the other a longitudinal inclination.

The operation of my device is extremely simple. So long as the aeroplane travels normally on what might be termed an even keel, the two rings 20 and 22 remain in the same plane as the fixed ring 10 and thereby indicate to the pilot that his machine is balanced. If, however, the machine is tipped longitudinally and pointing either up or down, the ring 30 assumes an angular relation to the ring 10. For instance, if the aeroplane is pointing downwardly, then the ring 20 (and the ring 22, provided there is no lateral tipping) will assume a position as shown in Fig. 3, the amount of the angle between the ring 10 and the ring 20 depending upon the inclination of the aeroplane. When there is a lateral dipping of the aeroplane to one side or the other, the ring 22 tips in the opposite direction to compensate for it. By noting the graduations on the meridian bands 30 and 32 which are in range with the ring 10, the pilot is informed as to the amount of lateral or longitudinal inclination and its direction.

In describing the operation of my device, I have considered it from the visual appearance presented and not from what actually happens. As a matter of fact, the rings 20 and 22 are at all times held by the force of gravity in the same position that is perpendicular to the earth's surface. The ring 10 being secured to the aeroplane is the ring that tilts with the aeroplane in relation to the surface of the earth; so that any change in the relation between the ring 10 and the rings 20 and 22 is due to movement of the ring 10 alone.

The ring 20 being pivotally mounted at two opposite points on the ring 10, will tilt with the ring 10 in a straight line between its pivot points, but even when tilted, the force of gravity holds the ring 20 in such position that that diameter of the ring 20 which is perpendicular to the diameter between its pivot points always lies parallel to the earth's surface, in consequence of which the longitudinal dip of the aeroplane is indicated by the relation of the ring 20 to the fixed ring 10, as indicated by the graduations on the band 30. Likewise the ring 22, being pivotally connected at two opposite points to the ring 20, will be tilted in a line longitudinal the aeroplane with the ring 20, but still the force of gravity will keep that diameter of the ring 22 which is at right angles to the diameter of its pivot points, at all times parallel to the earth's surface and therefore the relation of the ring 22 to the ring 10, as indicated by the band 32, will give a lateral dip to one side or the other of the aeroplane.

It will be observed that my indicator, both in construction and operation, is of extreme simplicity and that its indications are always positive and more accurate than those of a compass. Being susceptible of construction in small size, it takes up little space and can be placed at any convenient place in view of the operator.

It is to be understood that my invention is not to be limited to the precise construction herein shown and described as it may be embodied in various other forms all within the purview of my invention, and I desire to claim it broadly except where specifically limited in the following claims.

What I claim is:—

1. An aeronautical balance indicator having, in combination, a support adapted to be fixed in position, a ring fixed to said support in the horizontal plane of the aeroplane or other vehicle, a second ring pivotally mounted at two opposite points within said first ring and a third ring pivotally mounted within said second ring at two opposite points, said points lying in a line at right angles to the line of the pivotal points of said second ring, both of said rings being each provided with a depending meridian band marked with suitable graduations and arranged in a plane perpendicular to the plane of its respective ring and at right angles to the line of the pivotal points of its respective ring; one of said pivoted rings indicating the lateral inclination and the other of said pivotal rings indicating the longitudinal inclination of the aeroplane or other vehicle.

2. An aeronautical balance indicator having, in combination, a support adapted to be fixed in position, a ring fixed on said support in the horizontal plane of the aeroplane or other vehicle, a ring pivotally mounted at two opposite points within said fixed ring and a second ring pivotally mounted within said last mentioned ring at points at right angles to the pivotal points of said last mentioned ring, said pivoted rings having distinguishing colors, and one of said pivoted rings indicating the lateral inclination of the areoplane or other vehicle and the other of said pivoted rings indicating the longitudinal inclination thereof, both of said rings being each provided with a depending weighted meridian band, each band being marked with suitable graduations and arranged on its respective ring in a plane perpendicular to the plane of said ring and at right angles to the pivotal points of said ring.

3. An aeronautical balance indicator having, in combination, a support adapted to be fixed in position, a ring fixed on said support in the horizontal plane of the aeroplane or other vehicle, a ring pivotally mounted within said fixed ring and a second ring pivotally mounted within said last mentioned ring, one of said rings being so mounted as to indicate the lateral inclination of the aeroplane or other vehicle and the other being so mounted as to indicate the longitudinal inclination thereof, both of said rings being provided with a depending weighted meridian band, each band being marked with suitable graduations and arranged on its respective ring in a plane perpendicular to the plane of said ring and at right angles to the pivotal points of said ring.

4. An aeronautical balance indicator having, in combination, a support adapted to be fixed in position, a ring fixed on said support in the horizontal plane of the aeroplane or other vehicle, a ring pivotally mounted on and within said fixed ring and a second ring pivotally mounted on and within said last mentioned ring, one of said rings being so mounted as to indicate the lateral inclination of the aeroplane or other vehicle, and the other being so mounted as to indicate the longitudinal inclination thereof, both of said rings being provided with a depending weighted meridian band, each band being marked with suitable graduations and arranged on its respective ring in a plane perpendicular to the plane of said ring and at right angles to the pivotal points of said ring, both of said rings being skeleton rings in order that the meridian bands of both rings may at all times be within the view of the operator to facilitate the observation of the dip of the aeroplane, both in a longitudinal and lateral direction.

In witness whereof, I hereunto set my hand this twenty-ninth day of March, 1918.

WILLIAM J. FISHER.